Nov. 14, 1950     W. W. DICK     2,529,599
BRAKE PIN TOOL
Filed June 16, 1949     2 Sheets-Sheet 1
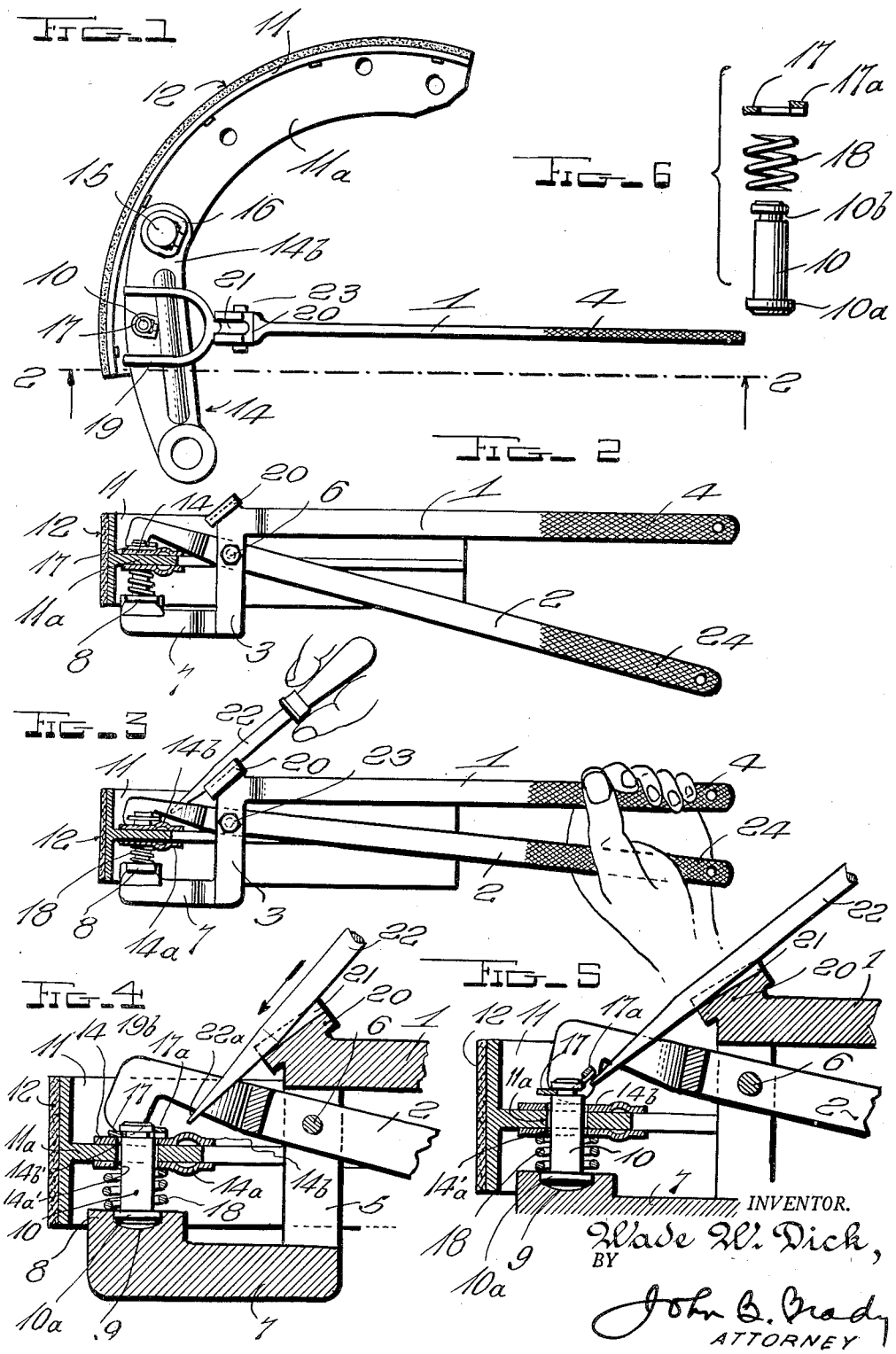
INVENTOR.
Wade W. Dick,
BY
John B. Brady
ATTORNEY

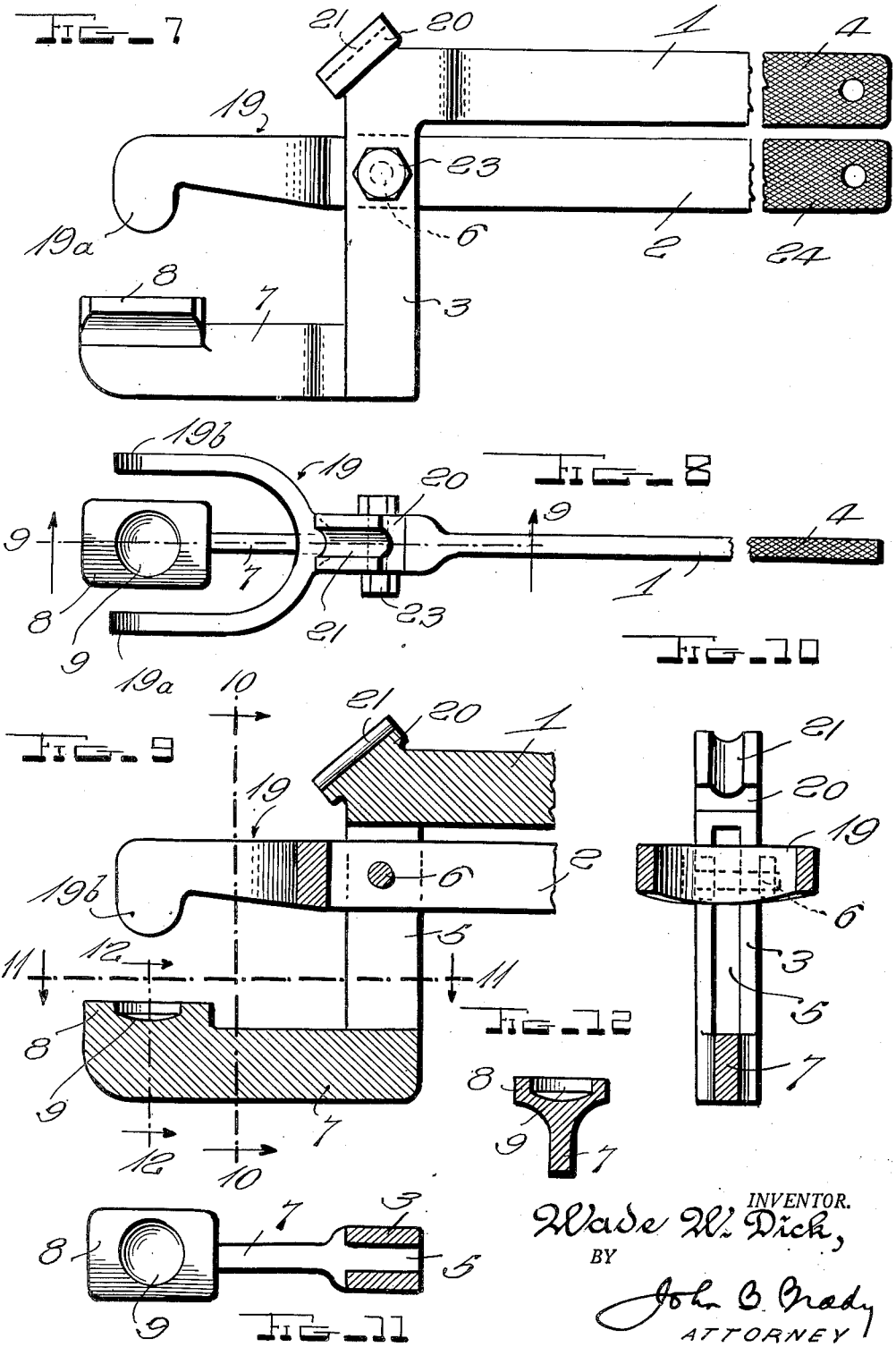

Patented Nov. 14, 1950

2,529,599

UNITED STATES PATENT OFFICE 2,529,599

BRAKE PIN TOOL

Wade W. Dick, Shreveport, La.

Application June 16, 1949, Serial No. 99,384

2 Claims. (Cl. 29—227)

My invention relates broadly to tools, and more particularly to an improved construction of brake pin spring compressor for facilitating the removal or replacement of lock rings in the confined space occupied by the brake bands in a vehicle brake.

One of the objects of my invention is to provide a special tool for performing the operation of compressing the brake pin spring of the anchor pins employed in the mounting of the brake bands of a vehicle brake, including a fulcrum lug for a pry facilitating the lifting of one side of the lock ring in disassembling the anchor links and pins from a brake shoe.

Another object of my invention is to provide a compact construction of brake pin spring compressor and lock ring removal device of compact assembly.

Still another object of my invention is to provide a composite brake pin spring compressor and lock ring pry device formed by a compact assembly of tool sections whereby one tool section is slotted for the passage and pivotal mounting of the other tool section, and with the faces of each terminus of the tool shaped to facilitate engagement of the anchor link and brake pin of the brake.

Still another object of my invention is to provide a construction of brake pin spring compressor and lock ring assembly and disassembly means, wherein the tool includes a pair of pivoted arms with one of the arms projecting through a slot in the other of the arms and pivoted therein, and wherein the arms terminate in specially shaped ends, one of the ends being in the form of a yoke having a pair of pressure applying termini, and the other of said terminus in a rectangular face disposed centrally of the termini of the yoke with a recessed socket therein for engaging the end of the brake pin for compressing the brake pin spring while assembling or disassembling the lock ring with respect thereto.

A further object of my invention is to provide an improved two-part tool for performing a brake pin spring compressing operation, in which one of the parts carries an angularly disposed fulcrum lug having a longitudinally extending recess therein forming a bearing face for a pry tool to be used in conjunction with the two-part tool in facilitating disassembly of the lock ring during a brake pin spring compressing operation.

Still another object of my invention is to provide a compact construction of composite brake pin spring compressor and lock ring remover designed particularly to speed up the removal of anchor links and pins in the relining of brakes and/or the exchange of brake shoes in vehicle brake assemblies.

Other and further objects of my invention reside in the compact construction of tool as set forth more fully in the specification hereinafter following, by reference to the accompanying drawings, in which:

Figure 1 is a side elevational view of one of the brake bands of a vehicle brake and illustrating the anchor link associated therewith, and showing the tool of my invention in position for performing a brake pin spring compressing operation during the exchange of brake bands, and showing particularly the fulcrum lug provided for the pry tool used in conjunction with the tool of my invention; Fig. 2 is a cross sectional view taken substantially on line 2—2 of Fig. 1, and illustrating the tool of my invention in elevation just prior to a spring compressing operation; Fig. 3 is a view similar to the view illustrated in Fig. 2 but showing the brake pin spring compressed and illustrating the manner in which a pry tool is used in coaction with the tool of my invention in facilitating the disassembly of the lock ring with respect to the slotted end of the brake pin; Fig. 4 is an enlarged view of the end portion of the tool of my invention illustrated in section and showing the tool positioned over the brake pin preparatory to a compressing operation and illustrating the manner of guiding the pry tool in the recessed face of the anvil carried by one of the parts of the tool; Fig. 5 is a view similar to the view illustrated in Fig. 4 but showing the tool in operation with the brake pin spring compressed and the pry tool moved to a position for disassembling the lock ring with respect to the slotted end of the brake pin; Fig. 6 is a view showing the parts of the brake pin, the associated spring and the lock ring employed in the assembly, with the parts illustrated in juxtaopposed position; Fig. 7 is a side elevational view of the tool of my invention shown on an enlarged scale with the handles thereof broken away and foreshortened; Fig. 8 is a plan view of the tool illustrated in Fig. 7 and showing particularly the manner in which the recessed fulcrum lug face of one part of the tool is centrally aligned with the yoke end of the other part of the tool and centrally aligned with an axis through the recessed anvil carried by the first mentioned tool part; Fig. 9 is a fragmentary longitudinal sectional view taken substantially on line 9—9 of Fig. 8; Fig. 10 is a vertical sectional view taken substantially on line 10—10 of Fig. 9; Fig. 11 is a horizontal sectional view taken substantially on line 11—11 of Fig. 9; and Fig. 12 is a vertical sectional view taken substantially on line 12—12 of Fig. 9 and showing particularly the shape of the socket recess in the rectangular fulcrum lug face of one part of the tool for receiving the end of the brake pin prior to a spring compressing operation.

The tool of my invention has been developed to facilitate the exchange of brake bands in vehicle brakes and permit a rapid assembly and disassembly operation which involves the compressing of the brake pin spring during the assembly and disassembly of the lock ring. I provide a longitudinally recessed fulcrum lug providing a bearing surface for a pry tool which may be used in conjunction with the tool of my invention in facilitating removal of the lock ring. This operation, while seemingly a simple one, is nevertheless both time consuming and often dangerous, as under the tension exerted by the spring there is the ever present possibility of the lock ring being ejected while the spring and brake pin fly out in opposite directions, under ordinary circumstances, and many times becoming lost or forming a hazard to the eyes of the repairman. The tool of my invention is very simple to operate and requires a minimum amount of skill and strength.

The tool comprises two drop-forged members, one of the members including a substantially right angular bend adjacent the end thereof and being slotted in the right angularly disposed portion for the passage of the other member therethrough. The last mentioned member is pivotally mounted adjacent the handle portion of the first mentioned member, and terminates in a yoke shaped end having a pair of offset terminating faces thereon for engaging the link of the brake assembly. The first mentioned tool member terminates in a substantially rectangular face having a centrally recessed socket therein which is aligned with a central axis through the tool members for engaging the end of the brake pin. This tool member is provided with an angularly disposed fulcrum lug at the junction of the right angularly extending portion of the handle portion of the tool member with a longitudinally extending recess therein for receiving and guiding a pry tool, the end of which is insertable beneath the edge of the lock ring for facilitating disassembly of the lock ring from the slotted brake pin during compression of the brake pin spring. I have used the tool of my invention with considerable efficiency of performance, and while I have set forth the tool in its preferred embodiments herein, I realize that modifications may be made and I desire that my disclosure herein be considered in the illustrative sense rather than the limiting sense.

Referring to the drawings in detail, reference character 1 designates one member of the two-part tool while reference character 2 designates the coacting member of the two-part tool. The member 1 includes a portion 3 which extends substantially normal to that portion of member 1 which constitutes the handle portion, suitably milled as represented at 4, forming a hand gripping and anti-slipping surface. The normally extending portion 3 has a slot 5 therein, through which the other coacting member 2 of the two-part tool extends and is pivoted as at 6 in a position adjacent the tool member 1. The first mentioned tool member 1 has a linearly extending portion 7 projecting from the normally extending portion 3 and terminating in a projecting face 8. The projecting face 8 is substantially rectangular in contour and has a central recessed socket 9 therein for receiving and guiding the flanged end 10a of the brake pin 10 in the brake pin assembly shown more particularly in Figs. 1-5.

The brake band assembly includes the brake shoe 11 having the brake lining 12 thereon and associated with the link 14 connected through pin 15. Pin 15 is illustrated as including the conventional lock ring connecting means 16. The link 14 is illustrated as including the pair of link members 14a and 14b which engage opposite sides of the T section 11a of the brake shoe 11 with aligned recesses 14a' and 14b' in plates 14a and 14b registering with aperture 11a' in T section 11a of the brake shoe for the passage of brake pin 10. The brake pin 10, as shown more particularly in Fig. 6, is provided with an annular groove 10b in the end thereof which projects beyond the face of the link 14b and receives the lock ring 17. The lock ring 17 has an outwardly projecting edge portion 17a which facilitates the gripping of the lock ring in both the assembly and disassembly operations. The brake pin spring 18 is illustrated interposed between the flanged end 10a of the brake pin 10 and the side plate 14a of the link 14. The assembly brake shoe and link with the brake pin spring 18 in expanded position is shown in the normal assembly position in Figs. 2 and 4.

The tool member 2 which extends through the slotted portion 5 of the tool member 1 and is pivotally mounted therein at 6 adjacent the handle portion of the tool member 1, is provided with a U-shaped end in the form of a yoke 19 shown more clearly in Figs. 1 and 8. The yoke 19 terminates at opposite sides thereof in offset ends 19a and 19b which project toward the projection 8 on linear portion 7 of tool member 1 for engaging one side of the plate 14b of the link assembly 14. Thus, the tool members 1 and 2 both terminate in faces directed inwardly toward each other where the offset ends 19a and 19b of yoke 19 serve to engage the side of plate 14b of link 14, while the recessed socket 9 in face 8 serves to engage the flanged end 10a of brake pin 10.

Tool member 1 is provided at its junction with normally extending portion 3 with an angularly disposed fulcrum lug 20. The fulcrum lug 20 may be integral with tool member 1 and the normally extending portion 3 thereof, or may be formed by welding a plate at an incline to the junction of the axis of tool member 1 and the normally extending portion 3. This fulcrum lug 20 is provided with a longitudinally extending socket recess 21 which is aligned with the central axis of the tool extending centrally through the face 8 of the linear portion 7 of tool member 1. The socket recess 21 serves to receive and guide a pry tool represented at 22 in Figs. 3, 4 and 5. The pry tool 22 has the end thereof at 22a engageable beneath the projection 17a of lock ring 17 as represented more particularly in Fig. 5, so that as pressure is applied to the end of the brake pin at 10a the spring 18 is compressed and the end of the brake pin 10 projected through the aperture 14b' in the side of plate 14b of link 14, thereby moving the grooved end 10b of the brake pin 10 to a position wherein the end 22a of pry tool 22 may be engaged beneath the projection 17a of lock ring 17 for raising the edge of the lock ring 17 to a position in which the lock ring 17 may be readily disassembled with respect to the end of the brake pin 10. Under these conditions brake pin 10 is readily removed and the brake shoe removed after disconnection from the pivotal mounting thereof in the brake assembly for exchange or relining.

It will be observed that the fulcrum lug 20 has a transverse dimension substantially equal to the transverse width of the enlarged normally extending portion 3 of tool member 1, as illustrated more particularly in Fig. 10. The angular disposition of the fulcrum lug 20 with respect to tool member 1, and the normally extending portion 3 thereof, is approximately 45° with respect to an axis passing through the normally extending portion 3 of tool member 1. I have found that with this angularity the pry tool 22 may be effectively used in the disassembly of the lock ring 17 with respect to the end of brake pin 10. The tool member 2 which is pivotally mounted at 6 through the slotted portion 5 of the normally extending portion 3 of the tool, is secured in the pivoted position by bolt member 23 which is located closely adjacent the handle portion of tool member 1. The end of tool member 2 is milled as represented at 24, to facilitate hand gripping of the tool.

By reason of the contour of the tool of my invention, the operating parts of the tool are more accessible to the congested assembly of the brake shoe and link of the conventional vehicle brake, so that the normally arranged operating end 3—7 of the tool of my invention has been specially designed for this purpose.

The compressing of the brake pin spring for replacement of the small lock ring on the end of the brake pin, which has been such a difficult accomplishment in the past, becomes greatly simplified with the tool of my invention.

While I have described my invention in one of its preferred embodiments, I desire that it be understood that no limitations upon my invention are intended other than may be imposed by the scope of the appended claims.

What I claim as new and desire to secure by Letters Patent of the United States is as follows:

1. A hand tool comprising a pair of tool operating members, one of said members having a substantially right angular bend portion therein and terminating in a linear extension substantially normal to the right angular bend, said right angular bend portion being slotted centrally thereof for the passage of the other of said tool members, said last mentioned tool member being pivoted within the slotted portion of said right angular bend portion at a position adjacent said first mentioned tool member, a yoke terminating in operating projections carried by said second mentioned tool member, a socket recessed portion aligned centrally with said yoke and carried by the linear extension of said first mentioned tool member, and a fulcrum lug carried by said first mentioned tool member at the junction of the right angular bend portion thereof with the tool member and inclined in the direction of the yoke in said second mentioned tool member, said fulcrum lug having a longitudinally extending socket recess therein for guiding a pry tool in a direction through the yoke of said second mentioned tool member.

2. A hand tool comprising a pair of tool operating members, one of said members having a substantially right angular bend portion therein and terminating in a linear extension substantially normal to the right angular bend, said right angular bend portion being slotted centrally thereof for the passage of the other of said tool members, said last mentioned tool member being pivoted within the slotted portion of said right angular bend portion at a position adjacent said first mentioned tool member, a yoke terminating in operating projections carried by said second mentioned tool member, a socket recessed portion aligned centrally with said yoke and carried by the linear extension of said first mentioned tool member, and a fulcrum lug carried by the junction of said first mentioned tool member with the right angular bend portion thereof, said fulcrum lug extending in a plane at approximately 45° to the axis of the said right angular bend portion, and a longitudinally extending socket recess in said fulcrum lug aligned with the axis of said first mentioned tool member and adapted to receive a pry tool fulcrumed therein in an axis extending through the yoke on said second mentioned tool member.

WADE W. DICK.

REFERENCES CITED

The following references are of record in the file of this patent:

UNITED STATES PATENTS

| Number | Name | Date |
|---|---|---|
| 1,346,306 | Duket | July 13, 1920 |
| 1,536,241 | Sroka | May 5, 1925 |
| 2,352,917 | Scott | July 4, 1944 |
| 2,360,459 | Widoe | Oct. 17, 1944 |
| 2,478,881 | Wayrynen | Aug. 9, 1949 |